Patented Mar. 7, 1933

1,900,700

UNITED STATES PATENT OFFICE

HANS FINKELSTEIN, OF UERDINGEN (NIEDERRHEIN), GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

CELLULOSE NITRATE LACQUER

No Drawing. Application filed July 13, 1928, Serial No. 292,596, and in Germany December 22, 1924.

The present invention relates to improved cellulose nitrate lacquers. In the industry of cellulose nitrate lacquers there is a great want for solvents which possess only a slight smell, remain neutral and which possess properties suitable for the most varied manners of use and especially for the manufacture of lacquers for application by brushing.

I have found that the monoalkyl ethers of butylene glycol, and in particular those which correspond to the general formula HO—$C_4H_8$—OR (in which R indicates an alkyl group with from 1 to 4 carbon atoms, such as the methyl, ethyl, propyl, isopropyl, butyl or isobutyl group), are excellent solvents for cellulose nitrate, and meet nearly all requirements of practice. The said ethers possess only a very slight, pleasant smell, are non-hygroscopic and remain neutral and do not form acids even on prolonged storage, as is the case with the largely used esters such as amyl acetate.

The said ethers possess a very great dissolving power for all kinds of cellulose nitrate usually employed in the lacquer industry. Accordingly the solutions possess a comparatively low viscosity and can be mixed to a great extent with diluents possessing no dissolving power, without separation of the dissolved cellulose nitrate taking place.

Particularly suitable diluents are for example benzene, toluene, xylene, aliphatic alcohols with 1 to 4 carbon atoms, benzine and the like. Other solvents may be employed in my improved lacquers, for example the mono- or dialkyl ethers or ethylene of propylene glycol, lactic esters, acetic esters, ketones and the like or mixtures of several such solvents.

The said monoalkyl ethers of butylene glycol need not be pure, but mixtures of several such ethers with each other or mixtures with the monoalkyl ethers of dibutylene glycol of the general formula

RO—$C_4H_8$—O—$C_4H_8$—OH which are sometimes obtained as by-products in the production of monoalkyl ethers of butylene glycol, may be employed.

The said ethers possess a very good dissolving power also for many natural and artificial resins compatible with the cellulose ester employed, for example artificial resins obtained by polymerization of vinyl esters. It is most advantageous to employ artificial resins obtained from cyclic ketones, such as cyclohexanone, with or without the aid of phenols and aldehydes. Also plasticizers and drying or non-drying oils may be added to the solutions, and the lacquers may be colored by the addition of suitable coloring matters so as to produce transparent or covering lacquers.

When adding drying oils, such as linseed oil or wood-oil, it is advisable and sometimes necessary to employ further solvents, such as butanol, cyclohexyl acetate, cyclohexanone and the like or mixtures thereof and also resins, which are compatible with the cellulose ester and the drying oils, such as colophony or an artificial resin obtainable from cyclohexanone, are advantageously added.

It will be obvious from the foregoing general explanations that it is possible according to my present invention to vary the properties of the lacquers within very wide limits and to fulfill all the requirements of practice, for example as regards the hardness, suppleness, adhesivness, and lustre of the coatings, the time required for drying and the like. If a very quick drying of the lacquer be desired, the content thereof of butylene glycol monoalkyl ether should be rather low for example from 5 to 15 per cent, the said solvent being vaporized rather slowly.

The following examples will further illustrate the nature of my invention which, however, is not limited to these examples. The parts are by weight.

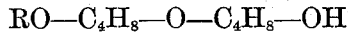

*Example 1*

100 parts of cellulose nitrate are dissolved in 500 parts of butylene glycol monoethyl ether and the solution is diluted with 400 parts of a mixture of ethyl alcohol and benzene. The lacquer forms glossy, transparent coatings.

*Example 2*

100 parts of cellulose nitrate and 25 parts of an artificial resin prepared from cyclohexanone, formaldehyde and phenol, are dissolved in 200 parts of butylene glycol monoethyl ether, 50 parts of ethylene glycol monopropyl ether and 100 parts of cyclohexyl acetate, and diluted with 550 parts of a mixture of 1 proportion of methanol and 2 proportions of toluene, 25 parts of tricresyl phosphate being added.

In the place of tricresyl phosphate other plasticizers such as esters of phthalic acid may be added to the solution which forms firmly adhering coatings of high lustre. The lacquer may be colored by suitable coloring matters, for example Rhodamine B or Prussian blue and the like.

This application is a continuation in part of my application for patent Ser. No. 76,107, filed December 17, 1925.

In the following claims, the term " a resin compatible with the cellulose nitrate " is intended to include only such resins as can be mixed with nitrocellulose solutions without causing turbidity or disintegration of these solutions.

What I claim is:

1. A composition of matter comprising cellulose nitrate, an artificial resin prepared from cyclohexanone, formaldehyde and phenol, and a solvent therefor containing a substantial proportion of a butylene glycol monoalkyl ether corresponding to the general formula $HO-C_4H_8-OR$ (in which R indicates an alkyl group with from 1 to 4 carbon atoms).

2. A composition of matter comprising cellulose nitrate, an artificial resin prepared from cyclohexanone, formaldehyde and phenol, and a solvent therefor containing a substantial proportion of butylene glycol monoethyl ether.

3. A composition of matter comprising 100 parts of cellulose nitrate, 25 parts of an artificial resin prepared from cyclohexanone, formaldehyde and phenol, 200 parts of butylene glycol monoethyl ether, 50 parts of ethylene glycol monopropyl ether, 100 parts of cyclohexyl acetate, 550 parts of a mixture of 1 proportion of methanol and 2 proportions of toluene and 25 parts of tricresyl phosphate.

In testimony whereof I have hereunto set my hand.

HANS FINKELSTEIN.